United States Patent [19]

Moore

[11] 3,873,728

[45] Mar. 25, 1975

[54] METHOD OF FEEDING RUMINANTS A HIGH-ENERGY FEEDSTUFF ADMIXED WITH A NPN SUPPLEMENT

[75] Inventor: William Percy Moore, Chester, Va.

[73] Assignee: Allied Chemical Corporation, New York, N.Y.

[22] Filed: Sept. 28, 1973

[21] Appl. No.: 401,721

Related U.S. Application Data

[63] Continuation of Ser. No. 245,269, April 18, 1972, abandoned.

[52] U.S. Cl. ............... 426/2, 426/69, 426/210, 426/373, 426/374, 71/11, 71/29, 426/807
[51] Int. Cl. ............... A23k 1/14, A23k 1/22
[58] Field of Search ........... 426/69, 74, 2, 807, 364, 426/373, 374, 456, 377, 213, 210; 71/11, 25, 26, 28, 29

[56] References Cited
UNITED STATES PATENTS

| | | | |
|---|---|---|---|
| 3,050,383 | 8/1962 | Wilson | 71/11 |
| 3,490,912 | 1/1970 | Freese | 99/2 ND |
| 3,512,986 | 5/1970 | Snyder | 426/2 |
| 3,677,767 | 7/1972 | McNeff | 99/6 |
| 3,733,203 | 5/1973 | Steen | 71/26 |

FOREIGN PATENTS OR APPLICATIONS

| | | | |
|---|---|---|---|
| 1,002,198 | 8/1965 | United Kingdom | 426/69 |
| 1,104,934 | 3/1968 | United Kingdom | 9/2 ND |

*Primary Examiner*—A. Louis Monacell
*Assistant Examiner*—Curtis P. Ribando
*Attorney, Agent, or Firm*—Fred L. Kelly

[57] ABSTRACT

A process for improving the nutrition of a ruminant by feeding to the ruminant a nutritive amount of a slow-release nitrogen product derived by acid catalyzed reaction of an amide, particularly urea or biuret, with a solid carbohydrate material comprising water-insoluble polysaccharides, said slow-release nitrogen product being fed in conjunction with a high-energy ruminant feedstuff selected from the group consisting of carbohydrates and fats.

3 Claims, No Drawings

METHOD OF FEEDING RUMINANTS A HIGH-ENERGY FEEDSTUFF ADMIXED WITH A NPN SUPPLEMENT

CROSS REFERENCES TO RELATED APPLICATIONS

This is a continuation of application Ser. No. 245,269, filed Apr. 18, 1972, now abandoned.

This application is related to U.S. application Ser. No. 228,313 filed Feb. 22, 1972.

BACKGROUND OF THE INVENTION

Farm animals are commonly grouped into two classifications: ruminant and monogastric. Ruminant animals, which include cattle and sheep, have a complex stomach of several compartments. The first stomach, lying next to the reticulum, is known as the rumen.

It is well known that ruminant animals have the unique ability of utilizing nonprotein nitrogenous compounds such as urea, biuret, formamide and acetamide, as well as phosphorus and sulfur compounds such as ammonium phosphates and ammonium sulfate. This is accomplished by the symbiotic relationship between microorganisms that multiply in the rumen and reticulum of the ruminant animals, which actually utilize the compounds and convert them into organismal material that can in turn be digested and absorbed by the ruminant.

As a nonproteinaceous source of nitrogen, urea is particularly attractive in feeding ruminants because it represents a concentrated and economical form of nitrogen. Pure urea contains about 46.5% nitrogen, but the amount that can safely be incorporated in ruminant feeds is limited by the fact that it possesses a definite toxicity limit toward ruminants. Accordingly, the art has long sought a practical and economical way of utilizing urea in animal feeds while at the same time minimizing its toxic propensities.

U.S. Pat. No. 3,490,912 discloses admixing a solution of urea with a solid absorbent feedstuff, drying the mixture, and pelleting the dried urea-containing feedstuff. Unfortunately, as presently utilized in animal feeds, such urea-containing feedstuffs must be supplied in limited amounts, for if too much is included in the feed, or if it is not well blended with the other ingredients, digestive or other disturbances may result which may even be severe enough to cause death.

SUMMARY OF THE INVENTION

The chief object of the present invention is to provide a process for improving the nutrition of ruminants.

Another object of this invention is to provide a nitrogen-containing ruminant feed which is relatively low in cost.

Another object of the present invention is to provide a nitrogen-containing ruminant feed supplement which is highly compatible with other ruminant feeds and is highly stable during storage.

A further objective of the present invention is to provide a feed supplement which is palatable to ruminants, assists the symbiotic microorganisms normally present in the digestive tract of ruminants and increases the ruminant's consumption of feed and feed efficiency.

Yet another object is to provide a slow-release nitrogen product suitable for use as a protein substitute in ruminant feeding.

Still other objects will be apparent from the subsequent description.

In accordance with the invention, I provide a process for improving the nutrition of a ruminant which comprises feeding to the ruminant nutritionally balanced quantities of (1) a high-energy ruminant feedstuff selected from the group consisting of carbohydrates and fats, and (2) a slow-release nitrogen product derived by a process comprising:

a. impregnating a solid carbohydrate material comprising water-insoluble polysaccharides with an aqueous solution of an amide selected from the group consisting of urea, biuret, formamide, and acetamide, and an acid catalyst, said catalyst being nontoxic to ruminants, thereby providing a catalyst for hydrolysis of the polysaccharides to form carbonyl groups reactive to the amide;

b. drying and reacting said impregnated solid material at a temperature within the range 160° to 290°F. to obtain a dried slow-release nitrogen product containing amide-polysaccharide adducts and at least about 5% water; and c. cooling the slow-release nitrogen product to ambient temperature.

The slow-release nitrogen product is generally formulated to contain a total nitrogen content of about 3 to 10 percent. Preferably, the total feed to the ruminant contains at least 1 percent nitrogen. A typical ruminant feed contains about 60–65 percent total digestible nutrients.

In terms of ruminant nutrients, the slow-release nitrogen component of the instant feed composition preferably contains about 20–60 percent protein equivalent. The protein equivalent may be controlled by adjusting the proportion of the amide solution admixed with the solid carbohydrate material.

Suitable acid catalysts for use in the invention include organic acids and salts such as acetic acid, propionic acid, and ammonium acetate; and mineral acids and salts such as nitric acid, ammonium nitrate, sulfuric acid, ammonium acid sulfate, ammonium sulfate, orthophosphoric acid, pyrophosphoric acid, superphosphoric acid and acid ammonium salts of said phosphoric acids. Preferred catalysts are superphosphoric acid and ammoniated superphosphoric acid made from wet-process phosphoric acid because these materials furnish valuable nutrient phosphate, are readily available commercially, and normally contain soluble trace minerals needed for plant and animal nutrition.

Aqueous ammoniated superphosphoric acid for use in the process of the invention can be produced by evaporating aqueous wet-process phosphoric acid to form superphosphoric acid, which is then ammoniated. Canadian Pat. No. 812,689, granted to Allied Chemical Corporation, relates to the concentration of wet-process phosphoric acid to produce superphosphoric acid, i.e., phosphoric acid containing polyphosphates.

The preferred aqueous ammoniated superphosphoric acid of this invention has a pH of from about 5 to 6, desirably about 6; a nitrogen content of from about 9 to 12 percent by weight, preferably from about 10 to 11 percent by weight; a total phosphorus content measured as $P_2O_5$ of from about 28 to 39 percent by weight, preferably about 34 to 38 percent by weight, and wherein polymeric phosphates represent from about 30 to 70 percent by weight, preferably from about 55 to 65 percent by weight, based on the weight of the total phosphorus content. The polymeric phosphates include pyrophosphates and polyphosphates.

An aqueous ammoniated superphosphoric acid (hereinafter referred to as "Solution A") was found to be particularly useful for purposes of the present invention:

| | |
|---|---|
| Nitrogen | 10.1% by weight |
| Phosphorus (as $P_2O_5$) | 34.2% by weight |
| Trace Minerals | 1 to 2% by weight |
| iron ($Fe_2O_3$) | ca. 1.0% by weight |
| calcium (CaO) | ca. 0.1% by weight |
| magnesium (MgO) | ca. 0.3% by weight |
| pH | 6.0 |
| Specific Gravity at 60°F. | 1.4 |
| Salting Out Temperature | ca. 0°F. |

Distribution as percent by weight of the ammonium phosphates of Solution A was about:
  35% ammonium orthophosphate
  51% ammonium pyrophosphate
  8% ammonium tripolyphosphate
  5% ammonium tetrapolyphosphate
  1% higher ammonium phosphates

DESCRIPTION OF THE PREFERRED EMBODIMENT

In accordance with one preferred embodiment of this invention, an aqueous solution containing 15 to 25 percent by weight of ammoniated superphosphoric acid (dry basis), 4 to 8 percent by weight of ammonium sulfate, 0 to 20 percent by weight of molasses or other water-soluble polysaccharides and 20 to 30 percent by weight of urea is sprayed onto a solid carbohydrate material such as alfalfa or orange pulp (containing water-insoluble polysaccharides), and the mass is mixed in suitable equipment such as a chip blender. Superphosphoric acid may be used in place of ammoniated superphosphoric acid, if desired. The mixing is carried out at a sufficiently high temperature to maintain the urea in aqueous solution during the spraying and mixing operation; a temperature in the range 50°–100°F. is normally used depending on the concentration of the supplement solution. Spraying is continued until the mass contains up to 60 percent by weight protein equivalent, on a dry weight basis. The resulting mixture is acidic, normally having a pH of 2 to 6. The damp mass is reacted and dried at a temperature of 180°–240°F. Partial hydrolysis of the polysaccharides takes place during the drying step thereby producing active carbonyl groups. A gas fired dryer is suitable equipment for the dryer operation. Product temperature in the dryer should not exceed about 290°F. and is normally maintained in the range 180°–240°F. Excessive drying temperatures may char the polysaccharides. The impregnated carbohydrate material is dried within 5 to 60 minutes sufficiently to remove most of the water, i.e., it is reduced to a dry, free-flowing material containing water at a level not less than about 6 percent and not more than about 12 percent water. During the drying, a significant proportion of the urea is reacted with the partially hydrolyzed polysaccharides to form polysaccharide-urea adducts.

The thus prepared and dried impregnated carbohydrate material is fed to ruminants together with nutritionally balanced quantities of a high-energy ruminant feedstuff selected from the group consisting of carbohydrates and fats.

The following examples are given for the purpose of further illustrating this invention. In these examples parts and percentages are by weight. Solution A used in these examples in an aqueous ammoniated superphosphoric acid (described in detail hereinabove) containing 10.1% N and 34.2% phosphate, as $P_2O_5$, prepared by the ammoniation of superphosphoric acid derived from wet process phosphoric acid. Of the phosphate present, 65% is in the polyphosphate form and 35% in the orthophosphate form. Solution A has a pH of 6.0.

Examples 1 and 2 taken together, demonstrate my preferred process for improving the nutrition of a ruminant by feeding to the ruminant a nutritive amount of a slow-release nitrogen derived by acid catalyzed reaction of an amide (particularly urea) with a solid carbohydrate material comprising water-insoluble polysaccharides, said slow-release nitrogen product being fed in conjunction with a high-energy ruminant feedstuff selected from the group consisting of carbohydrates and fats. In particular, Example 1 demonstrates a process for production of a preferred slow-release nitrogen product utilized as the main source of protein equivalent in the feed. Example 2 demonstrates the combination of the slow-release nitrogen product of Example 1 with high-energy ruminant feedstuffs in a nutritionally balanced feed which produces superior weight gains and nitrogen retention when fed to ruminants. Example 2 also furnishes a comparative feeding test to show that much better weight gains and feed adaptation are obtained using the feeding process of the present invention as compared to a similar process using urea directly in the feed. Additional examples are furnished to show alternative procedures for producing the slow-release nitrogen component of the feed composition of the present invention.

EXAMPLE 1

This example demonstrates the production of a slow-release nitrogen product from alfalfa hay harvested from several Nebraska fields in the summer and early fall and allowed to sun-dry prior to transportation to the feed production plant. Composition of a typical sample of alfalfa hay was as follows:

| Component | Weight Percent |
|---|---|
| Protein | 10.1–12.1 |
| Moisture | 27.1–29.8 |
| Fat (Ether Extract) | 1.7–2.4 |
| Crude Fiber (polysaccharides) | 18.1–19.9 |
| Ash | 6.3–7.3 |

Prior to use the alfalfa hay was passed through a chopper where it was reduced to particles of workable size.

A liquid feed supplement was used to furnish the acid catalyst for the reaction as well as urea and other nutrients. The liquid feed supplement used was made by mixing the following ingredients:

| Ingredients | Weight Percent In Mix |
|---|---|
| Solution A | 30.0 |
| Ammonium Sulfate, Crystals | 10.0 |
| Aqueous Urea Liquor (65% urea) | 40.0 |
| $CaCO_3$ (powdered limestone) | 5.0 |
| Water (total moisture 42.0%) | 15.0 |
| | 100.0 |

Since the supplement contained some suspended solids, the supplement was stirred during storage prior to use to prevent settling of the solids. The liquid feed supplement contained 106% protein equivalent and was composed as follows:

| Component | Weight Percent |
|---|---|
| Nitrogen | 17.1 |
| Protein Equivalent | 106.0 |
| Phosphorus | 4.6 |
| Sulfur | 2.5 |
| Calcium | 2.0 |

The chopped alfalfa hay and the liquid feed supplement were continuously fed into a conventional blender at a rate of about 3 tons per hour of alfalfa hay and about 700 pounds per hour of liquid feed supplement with rates held as constant as possible during a two hour test period. The rate of supplement feed was varied as required to maintain a protein equivalent of about 23–24 percent in the dried final product.

The moist impregnated alfalfa formed in the blender was fed to a conventional continuous rotary, gas fired dryer (which is also a reactor). Combustion gases fed to the dryer was maintained at about 2400°F. to permit efficient removal of water from the impregnated alfalfa. The dryer was suitably controlled to give a dried product having a temperature of about 180°F. The dried product contained about 8 percent water. Retention time in the dryer was about 10 minutes. The dried product containing slow-release nitrogen was cooled to ambient temperature (75°F.) and stored for use as described in Example 2. This product contained about 23.5 percent protein equivalent and about 51 percent total digestible nutrients. For convenience, the product of Example 1 is hereinafter called Product A.

EXAMPLE 2

Feed trials were conducted to demonstrate the effectiveness of the process of the present invention by feeding ruminants nutritionally balanced quantities of Product A of Example 1 and high-energy ruminant feedstuffs such as fat, starch, corn, etc. The feed trials were carried out by feeding sheep weighing 60–70 pounds. Effectiveness of the feed was indicated by weight gain of the sheep over a 30-day test period.

A group of ten sheep was fed a mixed ration that contained about 63% total digestible nutrients and about 6.6% protein equivalent. In order to demonstrate the palatability of the feed and to obtain maximum ruminant weight gain, the feed was fed on an unlimited or free-choice basis. Weight gain data were taken over a 30-day test period following a 7-day period allowed for adaptation to the feed. The composition of the ruminant feed ration used in the feeding test is summarized in the following table:

Composition of Feed Ration Used on Test Sheep

| Ingredient | Pounds per Ton of Ration |
|---|---|
| Product A | 330 |
| Corn | 266 |
| Barley | 364 |
| Molasses | 100 |
| Starch | 100 |
| Fat | 40 |
| Straw | 800 |
| | 2,000 |

This ration is nutritionally balanced according to known feeding standards.

The ration was reduced to a meal by grinding and pelleting in an extrusion type pellet machine; however, the ration may be fed as a meal, if desired.

Average daily weight gain of the sheep fed the test ration was 0.24 pound per day per sheep for the 30-day test period. Animal adaptation to the feed was excellent within the 7-day adaptation period. Average nitrogen retention by the ruminants was about 25 percent, a good nitrogen balance.

A comparative test was carried out by feeding sheep in the same manner with the same ration as above except that 318 pounds of dehydrated alfalfa and 12 pounds of urea were substituted for 330 pounds of Product A. With this urea-supplemented ration, adaptation to the feed was relatively poor and the average daily weight gain of the sheep was only 0.07 pound per day per sheep for the 30-day test. Thus, it can be noted that the weight gain of the urea supplemented animals was far inferior to that of the animals fed in accordance with the present invention.

EXAMPLE 3

This example shows another procedure for producing the slow-release nitrogen product utilized in the feed composition of the present invention.

In accordance with this procedure the dried product is maintained at 140° to 300°F., preferably at about 160° to 210°F., for 1 to 60 minutes prior to cooling in order to promote further reaction between residual urea and partially hydrolyzed polysaccharides.

The carbohydrate material used in this example was pulp from oranges after removal of juice and drying. The composition of the orange pulp was:

| Component | Weight Percent |
|---|---|
| Polysaccharides | 48.1 |
| Water | 10.1 |
| Ash | 5.1 |
| Nitrogen | 0.4 |

These polysaccharides are of two general types: those that form the skeletal structure of the orange, i.e., fibers, which are water insoluble, and water-soluble polysaccharides including simple sugars. The polysaccharides present were primarily of the insoluble type.

About 400 parts of the dried orange pulp was blended with 10 parts of Solution A and 100 parts of aqueous urea containing 40 parts of urea. The resulting mixture was reacted and dried in a rotating reactor for 25 minutes at atmospheric pressure, with temperature of the reaction mass maintained at about 205°F. by external heating of the reactor. Samples of the reaction mixture taken during the reaction period were tested with Fehling's solution and showed the presence of aldehydic carbonyl groups. The dried product (10% water) was then heated in a closed autoclave at 240°F. for 1 hour, then cooled to 75°F.

Overall recovery of particles of slow-release nitrogen was 97 percent. Similar results were obtained when bagasse, peanut hulls, wheat straw and waste paper were substituted for the dried orange pulp.

EXAMPLE 4

This example demonstrates that it is not necessary to utilize substantially pure urea as a source of amide nitrogen in the present invention. For this test, a mixed amide source was prepared by partial pyrolysis of urea at about 330°F. at atmospheric pressure to form biuret in accordance with known procedures, followed by addition of water and attapulgite clay to the pyrolyzate. Composition of the resulting mixture, which for convenience will be called "liquid amide source," was as follows:

| Component | Weight Percent |
| --- | --- |
| Biuret | 19.1 |
| Urea | 43.4 |
| Clay | 2.0 |
| Water | 34.5 |
| Triuret | 0.2 |
| Cyanuric Acid | 0.8 |
| Total Nitrogen 27.85% (wt.) | |
| Protein Equivalent 174% (wt.) | |

Orange pulp used in this example was essentially the same as that used in Example 3 except that it was undried and therefore contained 65 percent water. Processing was similar to Example 1 except that superphosphoric acid was used as the acid catalyst.

When the moist orange pulp arrived at the conversion plant it was shredded into small pieces so that sufficient surface would be available for rapid reaction with the amides. The orange pulp was then continuously transmitted to the blender where the liquid amide source, superphosphoric acid and the pulp were blended to form a homogeneous mixture which was acidic (pH about 2). The plant was operated for eight hours at the following feed rates: orange pulp — 2,000 pounds per hour; liquid amide source — 45 pounds per hour; and superphosphoric acid — 4.5 pounds per hour. Analysis of the superphosphoric acid catalyst was as follows:

| Component | Weight Percent |
| --- | --- |
| $P_2O_5$ | 73.0 |
| Percent of total $P_2O_5$ as Polyphosphate | 71.7 |
| F | 0.13 |
| $Fe_2O_3$ | 1.15 |
| $Al_2O_3$ | 0.81 |
| MgO | 0.20 |
| $SO_4$ | 2.75 |

The blended reactants were fed by means of a screw feeder into the continuous, direct gas fired rotary dryer (which is also a reactor) operating at essentially atmospheric pressure. The dryer-reactor was operated to allow entrance of reactants in one end and discharge from the other with back mixing minimized so that careful control was maintained over the amount of water removal. Enough moisture was maintained throughout the dryer to allow hydrolysis-degradation of the polysaccharides without charring the product. Discharge temperature of the solids was maintained at 190°F. and moisture content of the reacted material was maintained at 8 percent. The dried material was cooled to room temperature and stored for use in the feeding process of the present invention.

The product was also tested in conventional in-vitro artificial rumen tests using rumen fluid freshly withdrawn from a rumen-fistulated Jersey steer. In these tests, the product gave a relatively constant supply of ammonia nitrogen in amount which could be efficiently used by the animal.

DEFINITIONS

To more clearly define the terms used in this application the following definitions are furnished.

Polysaccharide: Any carbohydrate decomposable by hydrolysis into two or more molecules of simple sugars or monosaccharides.

Feeding Standards: Livestock requirements for different nutrients have been determined experimentally. Requirements vary for different classes of animals and at different periods of life. With cattle, for example, different amounts must be supplied to the growing calf, to the fattening steer, or to the cow as she passes successively through pregnancy, lactation and maintenance. The balancing of rations to meet the requirements of animals generally requires a combination of experience and education in the field.

Total Digestible Nutrients: Attempts to evaluate different classes and compositions of feed on a scale that expresses their energy values have resulted in employment of various devices in different parts of the world. The expression used most widely in the United States indicates total digestible nutrients. The quantities of digestible materials in a specific feed are calculated on the basis of experiments with animals. The sum of the digestible carbohydrates, plus the digestible proteins, plus 2.25 times the digestible fat, expresses the total digestible nutrients (T.D.N.). For purposes of the present invention, a "high-energy ruminant feedstuff" is a feedstuff having a T.D.N. of at least about 75 percent. Readily available textbooks on animal nutrition, particularly feeding and feeds, include:

Abrams, *Animal Nutrition and Veterinary Dietectics* (fourth edition 1961); and

Crampton and Harris, *Applied Animal Nutrition, the Use of Feedstuffs in the Formulation of Livestock Rations* (second edition 1969).

Slow-release nitrogen: The slow-release nitrogen product utilized in the ruminant feeding process of the present invention contains both water-soluble nitrogen and water-insoluble nitrogen, so that usable nitrogen becomes gradually available to the microorganisms in the rumen of the ruminant. The nitrogen may be determined to be either soluble or insoluble by A.O.A.C. tests (*A.O.A.C. Official Methods of Analyses*, Eleventh Edition, 1970, page 18).

Ruminant Feedstuffs: Modern livestock production utilizes a wide variety of feedstuffs. Feedstuffs are classified broadly as forages or roughages, and as concentrates. The forages or roughages are relatively bulky and constitute the mainstay in feeding ruminants. They include hays, silages, straws, fodders and other coarse materials. Concentrate feeds, less bulky, provide more total feed value per unit of weight than do forages. They include corn, other cereal grains, and mill byproducts derived largely from cereals and protein concentrates. The following table provides average composition of representative feeds in terms of dry matter, total digestible nutrients and digestible protein.

| Average Composition of Representative Feeds | | | |
|---|---|---|---|
| Kind of Feed | Dry Matter % | Total Digestible Nutrients % | Digestible Protein % |
| Green forages | | | |
| Alfalfa | 22 | 12 | 3 |
| Bluegrass | 30 | 12 | 3 |
| Dry forages | | | |
| Alfalfa hay | 90 | 53 | 11 |
| Alfalfa leaf meal | 91 | 54 | 15 |
| Silages | | | |
| Alfalfa silage | 31 | 17 | 4 |
| Corn silage | 25 | 17 | 1 |
| Grains | | | |
| Barley | 90 | 72 | 10 |
| Corn, yellow | 87 | 78 | 7 |
| Mill byproducts | | | |
| Corn gluten feed | 90 | 78 | 23 |
| Distillers' grains | 93 | 81 | 20 |
| Oil, seed-animal | | | |
| Cottonseed meal | 92 | 69 | 34 |
| Fishmeal | 93 | 73 | 56 |

I claim:

1. A process for improving the nutrition of a ruminant which comprises preparing a ground meal of nutritionally balanced quantites of (1) a high-energy ruminant feedstuff selected from the group consisting of grains, grain-mill byproducts, cottonseed meal and fishmeal and (2) a slow-release nitrogen product wherein said nitrogen product is derived by a process comprising:

a. providing a liquid ruminant feed supplement comprising 4 to 8 percent by weight of ammonium sulfate, up to 20 percent by weight of molasses, 20 to 30 percent by weight of urea, and 15 to 25 percent by weight, on a dry basis, of an aqueous ammoniated superphosphoric acid having a nitrogen content of about 9 to 12 percent by weight, a total phosphorus content measured as $P_2O_5$ of 28 to 39% by weight, and wherein polymeric phosphates represent about 30 to 70 percent by weight based on the total phosphorus content;

b. mixing said feed supplement with a solid natural ruminant feedstuff consisting of a ruminant forage selected from the group consisting of hays, silages, straws and fodders, containing water-soluble and water-soluble polysaccharides, a sufficient quantity of said feed supplement being provided in the mixture to cause the mixture to have a total nitrogen content of 3 to 10 percent, on a dry basis, thereby providing an acid catalyst for hydrolysis of the polysaccharides to form carbonyl groups reactive to the urea;

c. drying and reacting the mixture from step (b) in a conventional gas fired dryer at a temperature within the range 180° to 240°F. for 5 to 60 minutes to obtain a dried, reacted, slow-release nitrogen product containing 6 to 12 percent by weight of water; and d. cooling the slow-release nitrogen product to ambient temperature; and feeding to the ruminant the ground metal comprising said high-energy ruminant feedstuff and said slow-release nitrogen product.

2. The process of claim 1 wherein the ruminant forage in step (b) is alfalfa hay.

3. The process of claim 2 wherein the quantities of high-energy ruminant feedstuff and slow-release nitrogen product are selected so that the nutritionally balanced feed contains about 63 percent total digestible nutrients.

* * * * *

UNITED STATES PATENT AND TRADEMARK OFFICE
CERTIFICATE OF CORRECTION

PATENT NO. : 3,873,728
DATED : March 25, 1975
INVENTOR(S) : William Percy Moore

It is certified that error appears in the above-identified patent and that said Letters Patent are hereby corrected as shown below:

Column 4, line 4, "examples in" should read --examples is--.

Column 10, line 16, "water-soluble" should read --water insoluble--.

Column 10, line 31, "metal" should read --meal--.

Signed and sealed this 1st day of July 1975.

(SEAL)
Attest:

RUTH C. MASON
Attesting Officer

C. MARSHALL DANN
Commissioner of Patents
and Trademarks